United States Patent [19]

Plummer

[11] Patent Number: 4,806,034
[45] Date of Patent: Feb. 21, 1989

[54] WRITE HEAD CONTROLLER WITH GRID SYNCHRONIZATION

[75] Inventor: William T. Plummer, Concord, Mass.

[73] Assignee: Polaroid Corporation, Cambridge, Mass.

[21] Appl. No.: 154,302

[22] Filed: Feb. 10, 1988

[51] Int. Cl.$^4$ ............................................. B41J 21/16
[52] U.S. Cl. ................................ 400/279; 101/93.15; 346/139 C; 346/139 D; 250/231 SE; 250/237 G
[58] Field of Search ............... 400/322, 124, 126, 279, 400/705.1, 328; 101/93.15; 340/815.24; 250/231 SE, 237 R, 237 G; 346/239 C, 239 D

[56] References Cited

U.S. PATENT DOCUMENTS

| | | | |
|---|---|---|---|
| 3,153,111 | 10/1964 | Barber et al. | 88/14 |
| 3,833,807 | 9/1974 | Takeda | 250/234 |
| 3,970,781 | 7/1976 | Dalton et al. | 346/139 D |
| 4,028,732 | 6/1977 | Salter et al. | 346/76 L |
| 4,051,367 | 9/1977 | Sayce et al. | 250/237 |
| 4,078,173 | 3/1978 | Fultz | 250/237 |
| 4,247,214 | 1/1981 | Swan, Jr. | 346/139 D |
| 4,254,439 | 3/1981 | Fowler | 358/265 |
| 4,371,254 | 2/1983 | Beery | 355/14 R |
| 4,475,831 | 10/1984 | Drejza | 400/279 |
| 4,660,086 | 4/1987 | Lemelson | 358/183 |
| 4,700,065 | 10/1987 | Kordulla et al. | 250/237 G |
| 4,716,292 | 12/1987 | Rieder et al. | 250/237 G |
| 4,717,824 | 1/1988 | Sakamoto et al. | 250/237 G |
| 4,751,383 | 6/1988 | Veyama | 250/237 G |
| 4,757,196 | 7/1988 | Yamada et al. | 250/231 SE |

Primary Examiner—E. N. Eickholt
Attorney, Agent, or Firm—Francis J. Caufield

[57] ABSTRACT

A system for precisely positioning a printing element relative to a rotating drum, as in a drum printer, employs two position signals for alignment purposes. A pair of linear grids is disposed along a path of travel of the printing element for generating, with the aid of optical beam and sensor devices, a periodic electric signal which varies in accordance with printing element position. One of the grids is stationary and the second of the grids moves with a carriage supporting the printing element. An encoder positioned alongside the drum is operative with a set of markings having a variation in spatial frequency, or a grid overlay, to produce an alternating electric signal which varies in accordance with rotational position of the drum. Motors which rotate the drum as well as a lead screw which translates the printing element may be constructed as synchronous motors to permit phase locking to each other. Circuitry responsive to periodic signals outputtd by the linear grids and the encoder introduce phase shift between motor drive signals to align position of the printing element with position of the drum independently of any backlash which may be present between the lead screw and the carriage driven by the lead screw.

21 Claims, 7 Drawing Sheets

WRITE HEAD CONTROLLER WITH GRID SYNCHRONIZATION

BACKGROUND OF THE INVENTION

This invention in general relates to a system for precisely positioning a writing element along a rotating drum surface to, for example, print on a medium held by the drum and, more particularly, to such a system incorporating a linear grid disposed along a path of motion and a set of markings of varying density fixed to the drum for developing phase-locked signals for aligning the writing element position with drum position.

A common form of system in which a writing element is driven along a drum surface is found in a printer in which a rotating drum carries a printing medium past a stylus. The drum has a cylindrical surface and rotates about an axis of the drum. The stylus is carried by a carriage which is driven in a direction parallel to the drum axis by a lead screw. Electronic circuitry, which may include a memory for storing image data in the form of an array of pixels, actuates the stylus to print marks on the medium as the drum and the lead screw rotate.

In constructing such a printer, the leadscrew must be configured accurately to insure that the stylus translates precisely along a path parallel to the drum axis as the drum rotates since pixel data to be imprinted is addressed in the memory on the basis of the position which the pixel will have on the spiral. Any lack of precision in the construction of the lead screw, such as backlash between screw and carriage, may introduce a slight offset in pixel data from the prescribed position along the spiral. This results in a reduction of the accuracy of the construction of the image on the printing medium. Accordingly, it has been necessary to employ considerable care and expense in the construction of the lead screw and the carriage.

While the foregoing problem has been noticed in the case of printers employing a lead screw for translation of a stylus, it is to be understood that other mechanisms for the translation of the stylus may also require excessive care and expense in their construction. Furthermore, the problem is not restricted only to printers, but may also be found in other situations employing apparatus wherein a stylus or arm is to be translated along a path parallel to an axis of rotation of a drum wherein a tip of the arm is to interact with the drum at precise locations along the surface of the drum.

SUMMARY OF THE INVENTION

In accordance with the invention, two structures with grid markings are employed for generating periodic position signals which may be phase-locked to each other to accurately position an arm laterally along the surface of a rotating drum. The signals represent transverse position of the arm and rotational position of the drum so that phase locking to the signals aligns the position of the arm with the position of the drum. The arm is carried by a carriage which moves along a guide rail parallel to a rotational axis of the drum. A first one of the two signals is established by use of a pair of linear grids of equally spaced marks situate alongside the path traveled by the arm with one of the grids stationary while the other one is affixed to and moves with the carriage.

An optical system employing a beam of light illuminates the grids with relative motion between the two grids producing a periodic modulation of the intensity of the light beam. The second of the two signals is attained by the use of markings of varying density disposed on the drum or on a structure affixed to an end of the drum and illuminated by a beam of light such that movement of the markings introduces a modulation to the intensity of the beam of light. Motors are employed for rotating the drum and the lead screw or other device which translates the carriage. The motors, which may be synchronous motors, are locked to their respective drive signals. Circuitry is provided for injecting additional phase between the two drive signals, as by a momentary shift in frequency of motor drive signal, to align the position of the arm with the position of the drum. The phase correction is based on a measurement of phase difference between the two position signals.

With respect to the grid markings on or about the drum, various forms of grid markings are considered. For example, the grid markings can be accomplished by means of a set of marks of varying width or spacing disposed radially about an end surface of the drum or in parallel array upon the cylindrical surface of the drum. Alternatively, in the situation wherein the drum carries a print medium, the drum grid lines can be formed as an overlay positioned on top of the print medium. In this example, printing is accomplished by means of a laser beam of a predetermined frequency which passes through the grid lines while measurement of the positions of the grid lines is attained by use of an optical beam of a frequency which is reflected by the grid lines. Alternatively, it is possible to construct the drum grid lines by means of a pair of coaxial grids wherein one grid rotates with the drum while the other grid is stationary with a beam of light transversing both of the grids to produce a modulation of the light beam. The modulation of the light beam incident upon the linear grid to measure the position of the arm preferably is at a rate of a few cycles per cycle of drum revolution. In addition, the spacing of grid lines in the linear grids for measurement of arm position is selected to provide for a few cycles of modulation of the light beam during a transverse motion of the arm and carriage in an interval of a single drum revolution. The amount of transverse motion of the arm for each revolution of the drum is the pitch in a spiral path, such as a printing path on the drum. By use of additional sets of grid markings disposed on the drum, additional values of pitch can be selected.

BRIEF DESCRIPTION OF THE DRAWING

The foregoing aspects and other features of the invention are explained in the following description taken in connection with the accompanying drawing wherein.

DETAILED DESCRIPTION

Figure 1:
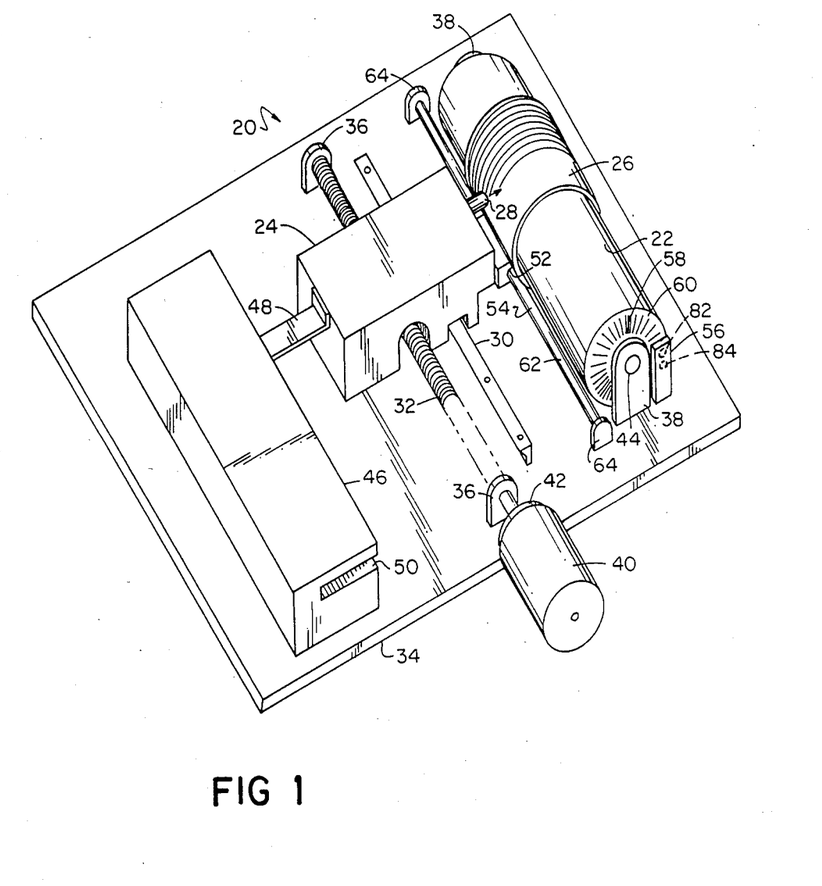
FIG. 1 is a stylized view of apparatus of the system of the invention employed for printing.

FIG. 1 shows the mechanical and optical portions of a system 20 which is constructed in accordance with the invention and includes a rotating drum 22 and a carriage 24 which translates along a path parallel to an axis of rotation of the drum 22. Although suitable for other uses, the system 20 is adapted to provide a printing function and, accordingly, drum 22 holds a printing medium 26 which encircles it. A print head 28 extends in the manner of an arm from the carriage 24 towards drum 22 for printing marks on the medium 26 during rotation of drum 22 and translation of carriage 24. By way of example, the print head 28 may incorporate a laser (not shown) which directs a beam of light onto medium 26 in the case where it is a photosensitive paper.

Carriage 24 slides along a guide rail 30 in response to rotation of a lead screw 32 which engages with threads (not shown) within carriage 24. The rail 30 is upstanding from a base 34 which serves to support and position the carriage 24 relative to the drum 22. Screw 32 is rotatably held by supports 36, the supports 36 serving to position screw 32 above base 34. Drum 22 is rotatably held and positioned above the base 34 by supports 38 disposed at opposite ends of it. A housing 40 encloses a motor and gear train, to be subsequently described. Housing 40 is attached by a bracket 42 to base 34. The motor within housing 40 imparts rotation to screw 34. A similar motor and gear train (not shown in FIG. 1) connects with a shaft 44 of drum 22 for rotating it as will be subsequently described.

An encoder 46 converts the position of carriage 24 to an electric signal which provides information needed for imprinting marks on medium 26. The encoder 46 sits on base 34 and receives a tang 48 which is secured to a backside of carriage 24 and extends within a slot 50 of encoder 46. The slot 50 permits transverse movement of the tang 48 and during transverse movement of the carriage 24, tang 50 operates to provide position data on carriage 24.

In accordance with a feature of the invention, precise positioning of carriage 24 relative to the drum 22 is attained optically by means of a carriage sensor 52 operative with a grid assembly 54 and a drum sensor 56 operative with grid-type markings 58 on an end surface 60 of drum 22. Both sensors 52 and 56 produce periodic signals, such as triangular or sinusoidal signals, which are used to adjust rotational positions of the motors which drive screw 32 and drum 22 as will be described hereinafter.

The electric output signals of sensors 52 and 56 allow the linear displacement of the carriage 24 to be phase locked to the rotational position of drum 22 independently of any backlash or other such defects which may be present in lead screw 32 and/or the interconnection of screw 32 with threading of the carriage 24.

Figure 2:
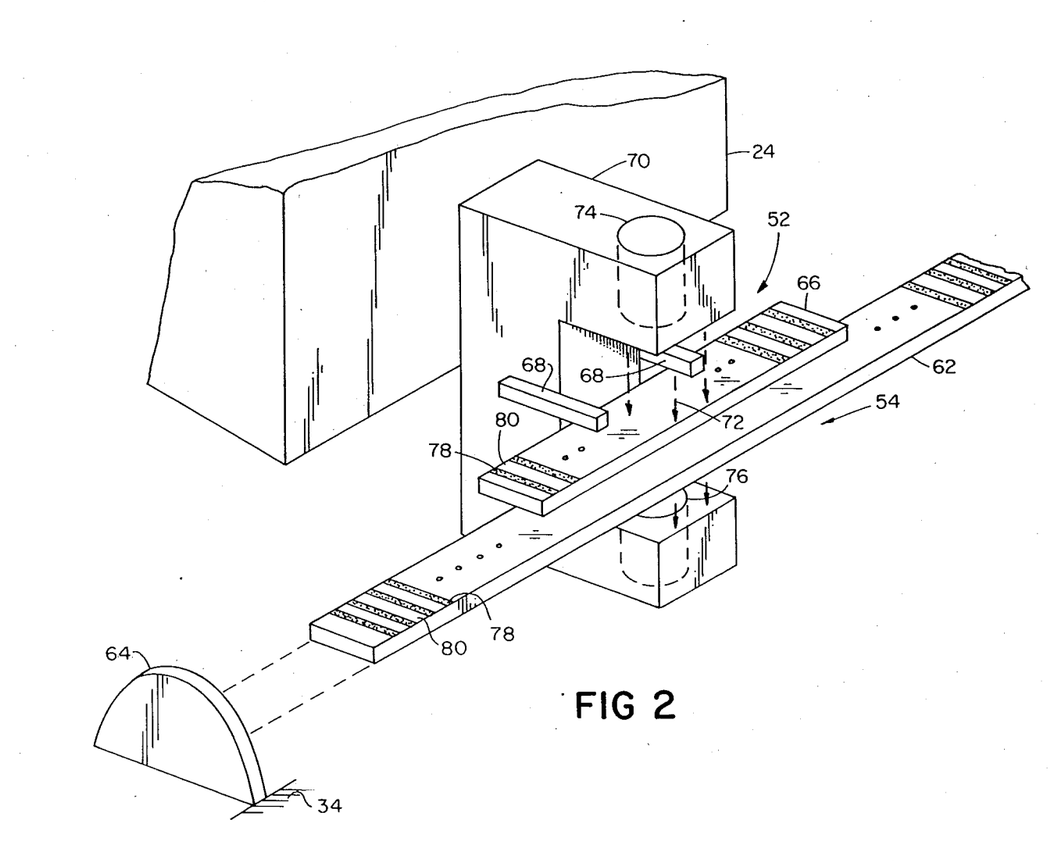
FIG. 2 is a diagrammatic view of a grid arrangement including optical sensing of grid position for the monitoring of position of an arm of the apparatus of FIG. 1.

Referring to FIG. 2, there is shown an enlarged view of carriage sensor 52 and grid assembly 54. The grid assembly 54 comprises a first grid 62 which is fixed to base 34 by supports 64 (only one shown), mounted at opposite ends of the grid 62, and a second grid 66 which is moveable relative to the grid 62 and is secured by arms 68 to a housing 70 of the carriage sensor 52. The second grid 66 is placed above the first grid 62 with a slight spacing therebetween, the spacing being sufficient to allow the grid 66 to pass freely over the grid 62. The sensor housing 70 extends over the top of the second grid 66 and beneath the first grid 62. A source 74 of light disposed in an upper portion of the housing 70 generates a light beam 72 directed at the grids 62 and 66. The light beam 72 is received by a light detector 76 located in a bottom portion of the housing 70. The housing 70 is secured to the carriage 24 and translates with it, along with the second grid 66, parallel to the axis of drum 22.

Each of the grids 62 and 66 is fabricated of a transparent dimensionally-stable material, such as glass, and is provided with a set of opaque grid lines 78 each of which has a width equal to the spacing 80 between them. While the spatial density and placement of the lines 78 can be chosen in a specific configuration to attain a desired resolution in the printing of pixels of an image on medium 26 (FIG. 1), in a preferred embodiment of the invention, lines 78 in both grids 62 and 66 are provided with a spatial frequency of 600 lines per inch. A higher frequency of lines provides for increased resolution in the printing of an image on medium 26.

The printing of marks at the pixel locations of the image is accomplished simultaneously with the translation of the carriage 24 and rotation of drum 22, with the result being a spiral path of imprinted marks on medium 26. The printing spiral may be tightly wound or loosely wound as may be selected for attaining a desired resolution in the printed image. By way of example in the preferred embodiment of the invention, carriage 24 advances a distance of three of the grid lines 78 during a single revolution of the drum 22. Thus, there are 200 revolutions of drum 22 during a traversal by the carriage 24 of one inch along guide rail 30 during the printing of an image. The pitch of the printing spiral is therefore, in this example, one two-hundredths of an inch.

It is also noted that the width of light beam 72 is sufficient to encompass at least several lines 78 to thereby increase the total light transmission through grid assembly 74 for improved signal-to-noise ratio over that which may be attainable if a viewing of the lines 78 took place through an optical system having no more than a narrow viewing slit. When lines 78 of grid 66 line up with the corresponding lines 78 of grid 62, there is a maximum transmission of light, a transmission of 50% of the available grid area exposed by beam 72. When lines 78 of grid 66 are in registration with spaces 80 of the grid 62, grid lines 78 of the two grids 66 and 62 block out, substantially, the passage of light from source 74 to detector 76. Therefore, the transmitted light of beam 72 varies from a maximum value to a minimum value of essentially zero as grid 66 passes over grid 62. The result is a periodic signal outputted by detector 76 as a triangular waveform. The frequency of the waveform is equal to the frequency at which a line 78 of grid 66 pass over lines 78 of grid 62.

Figure 3:
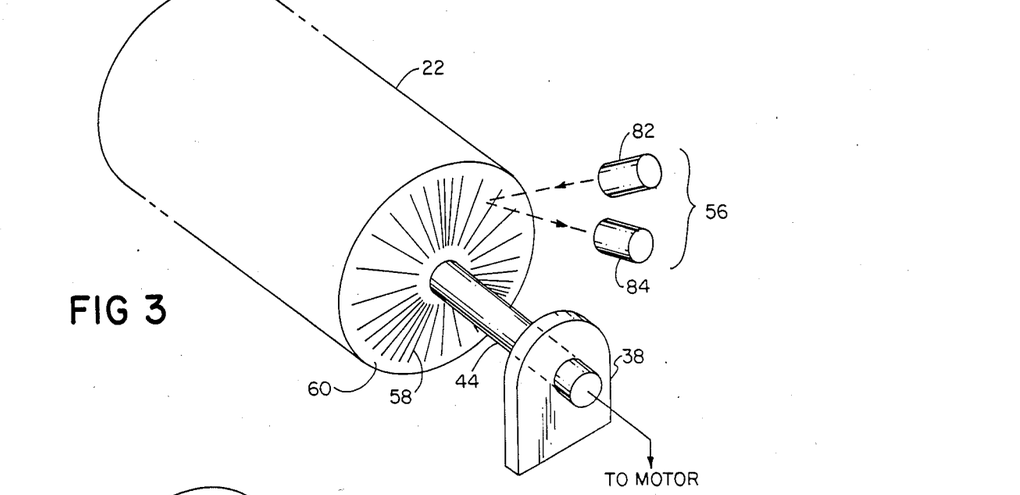
FIG. 3 shows drum-monitoring markings disposed in grid-like fashion along an end portion of the cylindrical surface of the drum.
Figure 4:
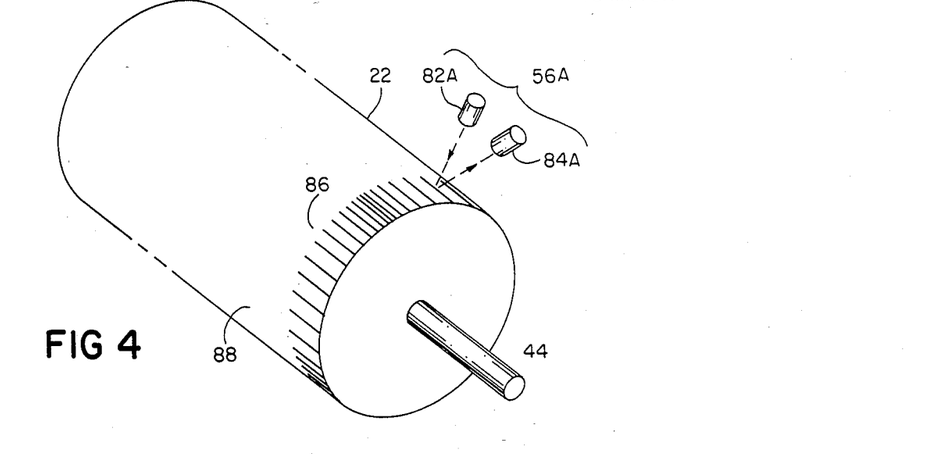
FIG. 4 is an enlarged diagrammatic view of a set of markings disposed at an end surface of the drum, the view including optical sensors operative with the markings to monitor rotational position of the drum of FIG. 1.

FIGS. 3 and 4 show alternate embodiments in the placement of markings to be viewed by drum sensor 56. FIG. 3 shows, diagrammatically, an enlarged view of the arrangement of markings 58 disclosed in FIG. 1. Markings 58 are arranged radially but with a variable spatial frequency.

Drum sensor 56 includes a light source 82 and a light detector 84 directed towards end surface 60 of drum 22 for scanning markings 58. The source 82 directs light towards end surface 60, and the light reflected at the end surface 60 back towards the light detector 84 are converted to an electrical signal having a magnitude which varies in accordance with the intensity of received light. Assuming that the markings 58 are formed of nonreflective paint, then a maximum optical signal is detected with maximum spacing between of markings 58. Alternatively, the end surface 60 may be coated with a nonreflective paint, and markings 58 may be formed of a reflective paint in which case maximum light signal is received at detector 84 for a maximum density of markings 58. In the preferred embodiment of the invention, markings 58 are applied with a spacing density that varies in a cyclical pattern, there being three cycles to the pattern in one encirclement of the end surface 60. As a result, during one revolution of drum 22, the detector 84 produces an output electric signal comprising a set of pulses in which the moving average, as averaged over a few of the pulses, varies repetitively at a rate of three cycles per revolution of drum 22. As noted above, the pitch of the printing spiral in this example of the construction of the system 20 is three lines 78 of grid 66 (FIG. 2) where this relationship was attained by virtue of the three cycles of marking density on end surface 60 of drum 22.

FIG. 4 shows an alternative embodiment in the construction of markings on drum 22. Instead of placing markings 58 on end surface 60 as disclosed in FIG. 3, they are placed on the end region of a circumferential segment of the surface 88 of drum 22. Both the spacing of markings 86 as well as their width are varied with progression along a circumference of the surface 88. Markings 86 are viewed by a drum sensor 56A comprising a light source 82A and a light detector 84A which are angled for illuminating and viewing the cylindrical surface 88, rather than the end surface 60 as disclosed in FIG. 3. The operation of the source 82A is the same as that of the source 82, and the operation of the detector 84A is the same as that of the detector 84. The amount of light received at the detector 84A depends on the spacings and the width of the markings 86 and, again depends on the spatial frequency of markings 86. As shown in FIG. 4, the spatial frequency of markings 86 varies, the variation being periodic with a repetition of three cycles in one encirclement of cylindrical surface 88. Therefore, the output signal of the detector 84A is a set of pulses wherein the moving average, as averaged over a few of the pulses, varies cyclically. If desired, markings 58 in FIG. 3 may also be varied in width as well as in spacing so as to provide a density in variation which is substantially sinusoidal. As a result of this arrangement, the pulse train signals outputted by the detectors 84 and 84A have a duty cycle which varies with a sinusoidal modulation.

Figure 5:
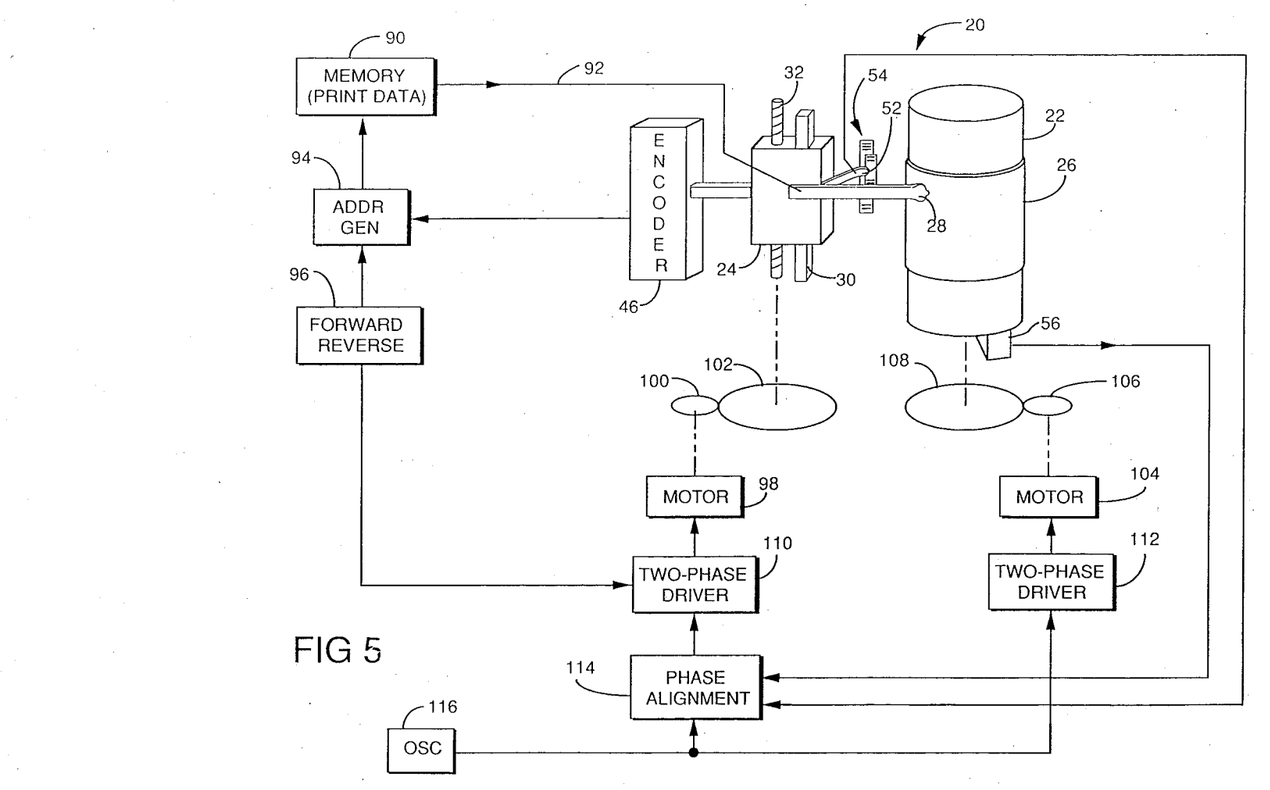
FIG. 5 is a block diagrammatic view of the system of FIG. 1 including components of electrical circuitry for positioning the arm and for rotating the drum.

FIG. 5 diagrammatically shows the essential mechanical components of system 20 and their interconnection with electrical components for driving lead screw 32 and drum 22 in response to electric signals outputted by carriage sensor 52 and drum sensor 56. Data to be printed by the print head 28 on medium 26 is stored in the form of individual pixels in a memory 90 connected by a line 92 to print head 28. The memory 90 outputs data on line 92 in response to addresses provided by an address generator 94. The generator 94 is, in turn, responsive to location signals outputted by the encoder 46 for addressing the memory 90 to provide pixel data corresponding to the location of print head 28 relative to drum 22. The lead screw 32 can be rotated in either forward or reverse directions for advancing the carriage 24 in a forward or reverse direction along the drum 22. The outputting of data from the memory 90 depends on whether carriage 24 is operating in a forward or reverse direction. Accordingly, a signaling circuit 96, which may be manually or automatically operated, is provided to direct the generator 94 to address the memory 90 in accordance with the direction of movement of carriage 24. Lead screw 32 is rotated by a motor 98 operating through a step-down gear train comprising gear 100 and 102 where gear 100 is rotated by motor 98 to drive gear 102. Gear 102, in turn, is affixed to lead screw 32. Similarly, drum 22 is rotated by a motor 104 operating through a step-down gear train comprising gears 106 and 108. Gear 106 is rotated by the motor 104 to drive gear 108 and gear 108 is affixed to shaft 44 (FIGS. 1 and 3) of drum 22 for rotating it.

The system 20 further comprises a driver circuit 110 for energizing the motor 98, a driver circuit 112 for energizing the motor 104, a phase alignment unit 114 and an oscillator 116. In operation, the oscillator 116 provides an AC (alternating current) signal directly to the driver circuit 112 and, via the alignment unit 114, to the driver circuit 110. Each of the motors 98 and 104 operates synchronously with respect to the phase of an incoming AC signal. By way of example, each of the motors 98 and 104 may be two-phase motors having stator windings which are to be operated in phase and in quadrature to an incoming AC signal. Circuits 110 and 112 operate in a well-known fashion to convert the single phase signal from the oscillator 116 to two-phase signals having in phase and quadrature components, which two-phase signals are applied to respective motors 98 and 104.

In the circuit 110, reversal of a phase connection to one of the stator windings of motor 98 causes it to rotate in the opposite direction. A signal from the signaling circuit 96 is applied to the driver circuit 110 to select the connection of signals to the stator windings of the motor 98 for forward or reverse rotation. Gear ratios of gears 100, 102, and gears 106, 108 are selected to provide for the translation of the carriage 24 in an amount equal to the pitch of the spiral path of pixels on drum 22. By way of example, assume that the thread of the lead screw 32 is selected to advance the carriage 24 a distance of 12 grid lines 78 (FIG. 2) for each revolution of screw 32. Then the gear ratios of gears 100, 102 and 106, 108 provide for a rate of rotation of drum 22 four times greater than the rate of rotation of lead screw 32. This allows the carriage 24 to advance a distance of three grid lines 78 for each revolution of drum 22 to match the pitch of the pixel spiral printed on the medium 26.

The speed of carriage 24 tracks the speed of the drum 22 so that, on the average, the pixels are printed in their proper position along the spiral. However, any perturbations in the manufacture of screw 32 may introduce a slight offset in the positions of some of the pixels on the spiral thereby degrading the quality of the image printed on the medium 26. If so, the carriage sensor 52 and grid assembly 54 sense the true position of the carriage 24 and apply a position monitoring signal to the alignment unit 114. This is compared to the position monitoring signal of the drum sensor 56. The alignment unit 114 adjusts the frequency of the AC signal from the oscillator 116 to shift the phase of rotation of the motor 98 which, via the gears 100 and 102, and screw 32 offsets the position of the carriage 24 to compensate for such perturbations in screw 32.

With respect to maximizing accuracy in the printing of the pixels, it is noted that it is advisable to locate the grid assembly 54 close to the outer end of the print head 28 so as to minimize the effect of any yaw which might be produced by motion of carriage 24 along screw 32 and rail 30. It is advantageous, furthermore, to configure carriage 24 such that its center of mass is located above or, preferably, directly on lead screw 32 so as to minimize the chance of any vibratory motion and yaw movement of carriage 24. As a practical matter, in the construction of the system 20, the grid assembly 54 may be placed directly beneath the outer end of the print head 28 so as to experience the same yaw and, thereby, monitor precisely the position of the outer end of print head 28. The use of the output signals of the carriage sensor 52 and the drum sensor 56 in the control of the relative rotations of motors 98 and 104 constitutes a feedback arrangement to compensate for imprecision of lead screw 32. In the foregoing example wherein three grid lines 78 are equal to the pitch of the pixel spiral, there are three cycles in the output signal of carriage sensor 52, as well as of drum sensor 56, per pixel dimension as measured along rail 30.

Figure 6:
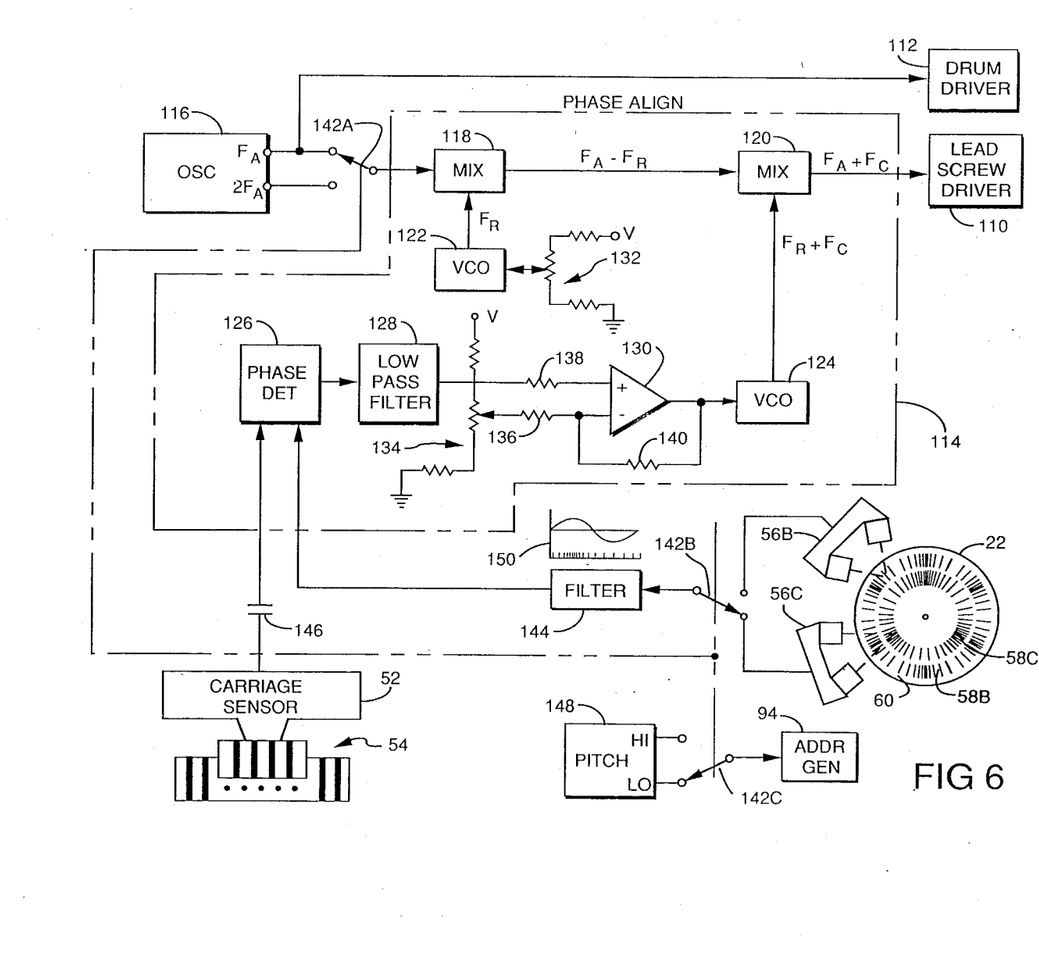
FIG. 6 shows circuitry of a phase alignment unit of FIG. 5 and a system configuration for adjusting a pitch of the arm with respect to rotation of the drum.

FIG. 6 shows the construction of the phase alignment unit 114 and other circuitry useful for implementing a form of operation of the system 20 wherein a selection can be made as to the magnitude of the pitch of the pixel spiral imprinted on the medium 26.

The operation of the phase alignment unit 114 in cooperation with the mechanical portions of the system 20 is similar to that of a phase-locked loop. The alignment unit 114 comprises two mixers 118 and 120, two voltage-controlled oscillators 122 and 124, a phase detector 126, a low pass filter 128 and an operational amplifier 130. Reference voltages are provided by two voltage dividers 132 and 134 each of which comprises a potentiometer serially connected between two resistors having terminals connected to a supply of voltage V and ground. The voltage divider 132 provides a reference voltage tapped off from the potentiometer to a control input terminal of oscillator 122 for adjusting a frequency of oscillation. In the voltage divider 134, a reference voltage provided at an output tap of the potentiometer is coupled via an input resistor 136 to the inverting terminal of amplifier 130. Another input resistor 138 connects an output terminal of filter 128 to the noninverting input terminal of amplifier 130. A feedback resistor 140 connects an output terminal of the amplifier 130 with its inverting input terminal.

In order to accommodate a change of pitch in the pixel spiral produced on drum 22, the drum sensor 56 has been replaced with two sensors 56B and 56C, each of which has the same form of construction as the sensor 56. Also, the single set of markings 58 (FIGS. 1 and 3) has been replaced with two sets of markings 58B and 58C. The set of markings 58B is constructed along the outer periphery of the end surface 60 of drum 22 and is viewed by sensor 56B. The set of markings 58C is constructed closer to the drum axis than markings 58B, and is viewed by the sensor 56C. The set of markings 58C is similar to that of markings 58 in that the markings 58C provide for a pulse train having a periodic modulation which cycles through three periods per single revolution of drum 22. In contrast, and by way of example, the set of markings 58B provides for a pulse train having a periodic modulation which cycles through six periods per single revolution of drum 22.

Also shown in FIG. 6 is a switch having three sections 142A, 142B and 142C which are ganged together. The switch section 142B connects either of the drum sensors 56B, 56C by a filter 144 to an input terminal of the phase detector 126. The carriage sensor 52 is coupled via a capacitor 146 to a second input terminal of the phase detector 126. A pitch designating circuit 148 is connected via switch section 142C to an input terminal of the address generator 94.

In operation, the drum sensor 56C reads the markings 58C during rotation of the drum 22 in the same fashion as was described earlier with reference to FIG. 3. The filter 144 may be constructed as a low pass filter with a capacitively coupled output. The bandwidth of the filter 144 is set to average over a few of the pulses in the pulse train signal outputted by the sensor 56C. For example, one period of such pulses is shown in the lower trace of a graph 150 appended alongside filter 144. The horizontal axis of the graph 150 represents time, and the vertical axis represents signal amplitude. The averaging effect of filter 144 produces a smoothly varying sinusoidal waveform with a DC (direct current) component. The capacitive coupling at the output of filter 144 removes the DC level to provide a sinusoidal waveform as shown in the upper trace of the graph 150. Similarly in the case of the carriage sensor 52, the capacitor 146 removes a DC level from the waveform outputted by the sensor 52 so as to provide an alternating voltage to the phase detector 126. The switch sections 142A–C are shown connected for the case wherein three cycles of the AC signals at the input terminals of the detector 126 occur for each revolution of drum 22. This is the situation described above with reference to FIG. 5 for the case of a single pitch.

In operation of the alignment unit 114, the potentiometers of the voltage dividers 132 and 134 are adjusted to establish approximately equal values of frequency of oscillation at the two oscillators 122 and 124. The oscillator 122 outputs a signal at a frequency FR to an input terminal of the mixer 118. The second input terminal of the mixer 118 receives a signal frequency $F_A$ from the oscillator 116, and outputs the difference frequency $F_A - F_R$ to the mixer 120. To this difference frequency, the mixer 120 adds the signal frequency $F_A + F_C$ obtained from the oscillator 124 to output an AC signal having a frequency of $F_A + F_C$ to the lead screw driver 110. $F_C$ is a correction frequency component. An AC signal at a frequency of $F_A$ is applied directly by the oscillator 116 to the drum driver 112.

The phase detector 126 outputs a signal representing the difference in phase between the signals to the two input terminals of detector 126. The output signal of detector 126 may be positive or negative, depending on the sense of the phase error. The output signal of detector 126 is coupled via the low-pass filter 128 and input resistor 138 to the noninverting input terminal of the amplifier 130. The filter 128 smooths the error signal outputted by the detector 126, and also aids in establishing a loop bandwidth and response time, as is well-known in the construction of phase-locked loops. The gain of the amplifier 130 is established primarily by the ratio of the resistors 140 and 136, which gain may be set at a value of unity, or other value suitable for providing a desired loop gain for control of the relative speeds of the motors 98 and 104 (FIG. 5).

In the absence of any phase error, the oscillator 124 outputs a frequency $F_R$ which is equal to the frequency of the oscillator 122, in which case both of the drivers 110 and 112 are driven by signals having the same frequency $F_A$. In the event of the phase error, the output voltage of the amplifier 130 shifts in value to offset the frequency of the Oscillator 124 by a suitable correction frequency $F_C$, in which case the frequencies of the AC signals applied to the two motors 98 and 104 differ by the correction frequency $F_C$. The correction frequency $F_C$ persists for a sufficient amount of time to adjust the position of the carriage 24 so as to compensate for perturbations in the construction of lead screw 32.

In the event that it is desired to change the pitch of the pixel spiral on the drum 22, then the switch sections 142A-C are operated to place each of the sections in the alternate position. By way of example, as noted above, the set of markings 58B provides twice as many modulation cycles per revolution of the drum 22 as does the set of markings 58C. This 2:1 ratio is presented by way of example only, it being understood that other ratios such as 5:3 or 3:1 may be employed.

In the case of the exemplary 2:1 ratio, the carriage 24 must advance through twice as many grid lines 78 (FIG. 2) in the case of the six modulation cycles than in the case of the three modulation cycles. The switch section 142A applies an oscillator frequency of $2F_A$ via the mixers 118 and 120 to driver 110 while the driver 112 is still receiving a signal frequency of $F_A$ oscillator from 116. As a result, lead screw 32 is driven at double the previous rotational frequency to accommodate the enlarged pitch. It is noted that the switch section 142B connects the drum sensor 56B via filter 144 to phase detector 126. Also, the pitch designating circuit 148 applies a digital signal via switch section 142C indicating the high value of the pitch to the address generator 94. Consequently, the memory 90 (FIG. 5) is addressed in accordance with the high value of pitch to output pixel data for imprinting the image on medium 26.

It is noted that the circuit 148 may be of relatively simple configuration, simply providing a high voltage or grounding signal, by way of example, at the two switch positions to designate the appropriate value of pitch. By way of further embodiment, it is noted that additional markings such as the markings 58B and 58C may be included within the end surface 60 for still further values of pitch. In such case, additional digital signals would be outputted by the circuit 148 to the address generator 94, additional sensors such as the sensor 56 would be employed, and additional values of frequency would be outputted by the circuitry of oscillator 116. Also, additional positions would be provided for the switch sections 142A-C to establish the desired pitch.

Figure 7:
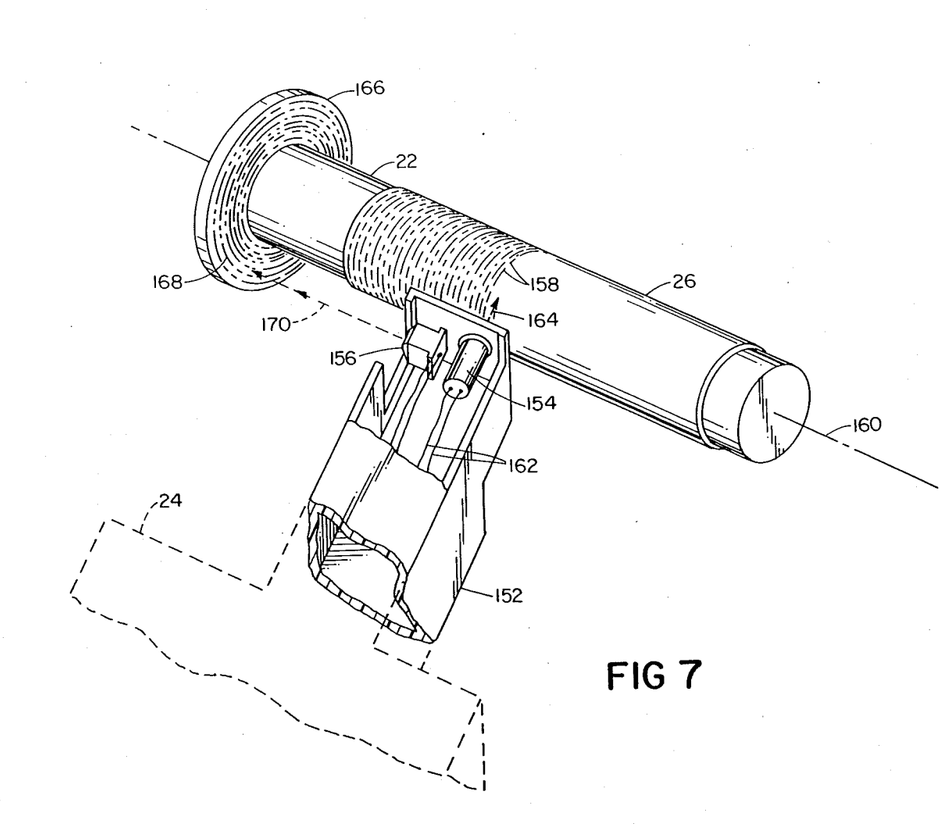
FIG. 7 is an alternative embodiment in the construction of markings by use of a disc extending transversely to an end surface of the drum for monitoring a position of the drum.

FIG. 7 shows an enlarged fragmentary view of a portion of an alternative embodiment of the system 20, the view showing an arm 152 of carriage 24 (shown in phantom) which has been enlarged to support both a print head 154 and a sensor 156. The arm 152 extends from carriage 24 to position the print head 154 alongside the medium 26 carried by drum 22 for imprinting pixel marks 158 as drum 22 rotates about its axis 160.

The print head 154 may be fabricated as a solid state laser enclosed within a housing with electric leads 162 extending therefrom to serve as the line 92 (FIG. 5) by which data signals are coupled from memory 90. A light beam 164 is emitted by the laser of the print head 154 to produce marks 158 on medium 26.

In accordance with this embodiment of the invention, an annular plate 166 extends transversely of the drum 22 at an end thereof, and carries a set of markings 168 on its surface facing sensor 156. The sensor 156 directs a light beam 170 towards the plate 166. The beam is reflected by the plate 166 back to the sensor 156. Reflections of the beam 170 are modulated in a periodic fashion by markings 168. Sensor 156 responds to the modulations of the reflected light beam by outputting a periodic electric signal suitable for operation of the alignment unit 114 ( FIG. 5) to synchronize the printing of the pixel marks 158 with the positions of drum 22 and carriage 24.

Figure 8:
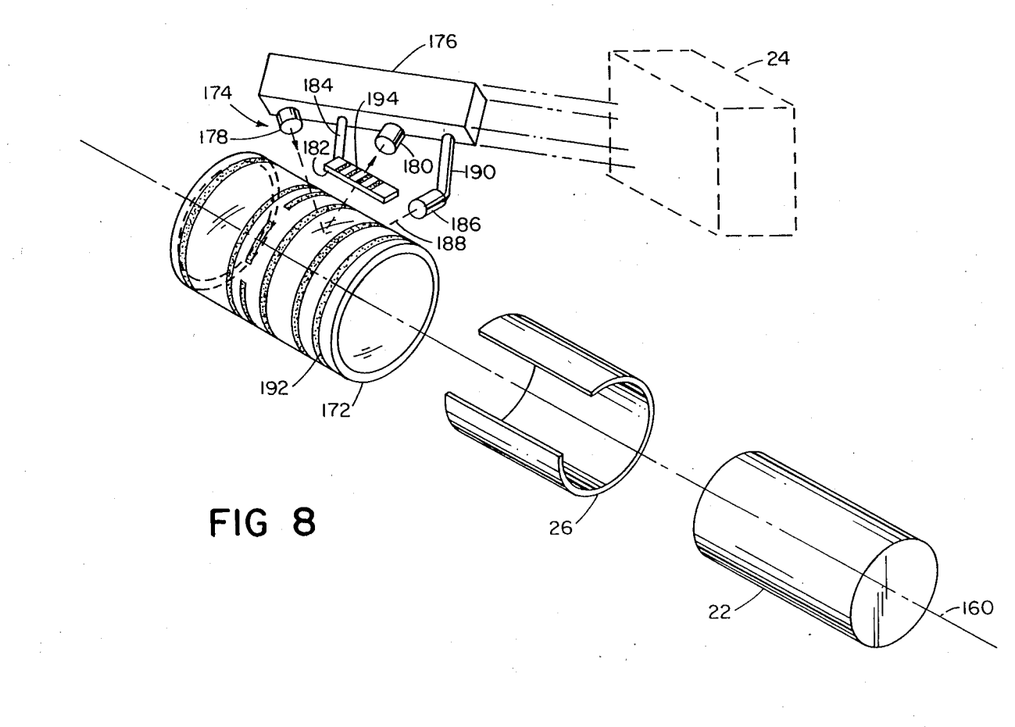
FIG. 8 is an alternative embodiment showing structure of grid-like markings for positioning the arm, the grid-like markings being provided as an overlay upon a printing medium carried by the drum.

FIG. 8 shows an alternative embodiment of the system 20 wherein the grid marks of the grid assembly 54 (shown as lines 78 on the stationary grid 62 in FIG. 2), are formed in the alternative embodiment of FIG. 8 on a transparent cylindrical jacket 172. FIG. 8 is a simplified exploded view showing the encirclement of the drum 22 with the medium 26 and the enclosure of the medium 26 by jacket 172. Also shown, in stylized diagrammatic form, is a sensor 174 mounted by an arm 176 to carriage 24. The sensor 174 includes a light source 178 for transmitting a light beam towards the jacket 172 and the medium 26 and a detector 180 which receives the beam of light as reflected by medium 26 through the jacket 172. A linear grid 182 is rigidly secured by a strut 184 to the arm 176. The grid 182 has the same general configuration as the grid 66 (FIG. 2) and may have a flat surface, as does the grid 66, or may have preferably a surface curved to match the curvature of the cylindrical surface of the jacket 172. A print head 186 directs a write beam 188 through the transparent jacket 172 to the medium 26 for imprinting pixel marks thereon. In the diagrammatic presentation of FIG. 8, the print head 186 is shown secured to the arm 176 by a strut 190; however, it is to be understood that, in practice, the print head 186 may be secured within a mechanical configuration of an arm such as the arm 152 of FIG. 7.

The jacket 172 is provided with circular grid lines 192 which encircle the jacket 172 in planes perpendicular to the drum axis 160. The width and spacing of the lines 192 is the same as that of the lines 78 of the grid 66 (FIG. 2). The linear grid 182 is provided with grid lines 194 which also have the same width and spacing as do the lines 78 of the grid 66 (FIG. 2) and extend in planes transverse to the drum axis. Linear grid 182 is formed of a transparent dimensionally stable material such as glass or a polycarbonate resin or acrylic resin, which materials may also be used in construction of the jacket 172. The grid 182 is closely spaced to jacket 172, the spacing being sufficient to provide adequate clearance to allow for relative motion between them.

Lines 192 are fabricated of a material which is transparent to radiation at the wavelength of the light in the write beam 188, but which is opaque to radiation at the wavelength of light produced by the source 178. Thereby, the imprinting of marks on the medium 26 by the print head 186 can proceed in the same manner as has been disclosed for the embodiment of FIG. 5. However, due to the opacity of the lines 192 to light of the source 178, the sensor 174 operates in the same fashion as does the carriage sensor 52 (FIG. 2). The detector 180 views light reflected from the medium 26 and transmitted in the spaces between the grid lines 192 and in the spaces between the grid lines 194. During transverse movement of the carriage 24 relative to the drum 22, the beam of light received at the detector 180 is modulated by the motion of the grid lines 194 past the grid lines 192 resulting in the outputting of an electric signal from the detector 180 which is the same as the electric signal outputted by the detector 76 of the carriage sensor 52 (FIG. 2). The embodiment of FIG. 8 is advantageous in that registration between the set of grid lines 92 and an image on the medium 26 is maximized, and is assured even if vibration is present in the mechanical components of system 20 during a printing process. This insures precise construction of the image.

By virtue of the invention, the printing system is capable of printing a highly accurate image even in the situation wherein the carriage transport lacks high precision, such as in the use of a coarse lead screw. The use of photooptically generated signals permits the phase locking of carriage transport to drum rotation. By use of a set of markings having a periodic format on the drum, or attached to the drum, a preselectable pitch of a printing spiral can be established.

It is to be understood that the above described embodiments of the invention are illustrative only, and that modifications thereof may occur to those skilled in the art. Accordingly, this invention is not to be limited to the embodiments disclosed herein, but is to be limited only as defined by the appended claims.

What is claimed is:

1. A system for positioning a carriage relative to a rotatable drum, said system comprising:
    a drum rotatable about an axis;
    a carriage having arm means for interaction with said drum and displacement means for moving said carriage along a path parallel to said drum axis;
    grid means disposed along said path for generating a first signal designating a position of said carriage along said path during movement of said carriage;
    sensor means operatively connected to said drum for generating a second signal designating rotational position of said drum during rotation of said drum; and
    synchronizing means responsive to said first and said second signal synchronizing movement of said carriage with rotation of said drum.

2. The system according to claim 1 further comprising a drum motor for rotating said drum, and wherein:
    said displacement means comprises a carriage motor for moving said carriage along said path; and
    said synchronizing means includes means for applying drive signals to said motors and alignment means for introducing a phase shift between the drive signals to align a position of said drum with a position of said carriage.

3. The system according to claim 2 wherein said displacement means includes a lead screw, rotated by said carriage motor for urging said carriage along said path.

4. The system according to claim 1 wherein said grid means comprises a first grid disposed along said path and a second grid fixed to said carriage, said carriage being movable relative to said first grid for moving said second grid alongside said first grid, said grid means further comprising optical means for directing a light beam serially through said first and said second grids such that relative motion between said grids introduces a modulation of said light beam, said optical means including a detector of said modulation of said light beam for outputting said first signal.

5. The system according to claim 1 wherein said sensor means includes a set of markings of varying spatial frequency fixed to said drum and optical means for illuminating said set of markings with a light beam, the varying spatial frequency of said markings modulating said light beam upon rotational movement of said drum, said optical means including a detector of modulation of said light beam for outputting said second signal.

6. The system according to claim 1 wherein said grid means comprises a first grid disposed along said path and a second grid fixed to said carriage, said carriage being movable relative to said first grid for moving said second grid alongside said first grid, said grid means further comprising optical means for directing a light beam serially through said first and said second grids such that relative motion between said grids introduces a modulation of the light beam of said grid means, said optical means of said grid means including a detector of modulation of the light beam of said grid means for outputting said first signal; and wherein said sensor means includes a set of markings of varying spatial frequency fixed to said drum and further optical means for illuminating said markings with a light beam, said markings having a varying spatial frequency for modulating said light beam of said sensor means upon rotational movement of said drum, said optical means of said sensor means including a detector of modulation of said light beam of said sensor means for outputting said second signal.

7. The system according to claim 1 further comprises a drum motor for rotating said drum, and wherein:
    said displacement means comprises a carriage motor for moving said carriage along said path; and
    said synchronizing means includes means for applying drive signals to said motors and alignment means for introducing a phase shift between the drive signals to align a position of said drum with a position of said carriage, said grid means comprising a first grid disposed along said path and a second grid fixed to said carriage, said carriage being movable relative to said first grid for moving said second grid alongside said first grid, said grid means further comprising optical means for directing a light beam serially through said first and said second grids such that relative motion between said grids introduces a modulation of the light beam of said grid means, said optical means of said grid means including a detector of modulation of the light beam of said grid means for outputting said first signal;
    said sensor means includes a set of markings of varying spatial frequency fixed to said drum and further optical means for illuminating said markings with a light beam, said markings having a varying spatial frequency for modulating said light beam of said sensor means upon rotational movement of said drum, said optical means of said sensor means including a detector of modulation of said light beam of said sensor means for outputting said second signal; and
    said markings of said sensor means are arranged with a periodic variation in spatial frequency to provide a periodic modulation to the light beam of said sensor means, said first grid and said second grid each having markings positioned uniformly along the respective grids for introducing a periodic modulation of the light beam of the grid means, the first and the second signals having periodic waveforms corresponding to the modulations of the light beams of the grid means and the sensor means, respectively.

8. The system according to claim 7 wherein a frequency of the periodic waveform of said first signal is equal to a frequency of the periodic waveform of said second signal, said alignment means of said synchronizing means including a phase detector for outputting a phase difference between said first and said second signals, and further including:
oscillator means driven by said phase detector for introducing a frequency shift to the drive signal of one of said motors to null the phase difference and align the position of said drum with the position of said carriage.

9. The system according to claim 8, wherein in the set of markings of said sensor means, their periodic variation in spatial frequency undergoes a plurality of cycles in one revolution of said drum.

10. The system according to claim 9 wherein, in the sensor means, the number of cycles of variations of marking spatial frequency per revolution of the drum, as compared to the number of periods of modulation introduced by said grid means per unit of travel of said carriage along said path, establish a pitch in the interaction of said arm means with said drum, there being a printing medium carried by said drum past a point of interaction of said arm means with said drum, said arm means being formed as a printing stylus, and
said system including means for activating said stylus to imprint said printing medium at the point of interaction, and wherein said sensor means includes a further set of markings having a different number of spatial frequency variation cycles per revolution of said drum than the first-mentioned set of spatial frequency variation cycles of the first mentioned markings to permit a variation in said pitch.

11. The system according to claim 10 wherein said synchronizing means includes means for altering the drive signal of one of said motors to change the speed thereof in conformance with a change of pitch.

12. The system according to claim 11 wherein said displacement includes a lead screw rotated by said carriage motor for urging said carriage along said path.

13. A system for positioning a carriage relative to a rotatable drum, said system comprising:
a drum rotatable about an axis, said drum adapted to supported a printing medium encircling said drum;
a carriage having a print head facing said drum;
displacement means including a lead screw for moving said carriage and print head along a path parallel to said drum axis where concurrent motions of revolution of said drum and displacement of said carriage introduces a path of marks printed on said medium in the form of a spiral;
grid means disposed along said path for generating a first signal designating position of said carriage along said path during movement of said carriage;
sensor means operatively connected to said drum for generating a second signal designating rotational position of said drum during rotation of said drum;
synchronizing means responsive to said first and said second signals for synchronizing movement of said carriage with rotation of said drum, said synchronizing means including means for rotating said lead screw and said drum at different rates of rotation, said rotating means including means for adjusting rates of rotation of said lead screw and said drum relative to each other; and wherein said sensor means introduces to said second signal a periodic modulation having a plurality of cycles per revolution of said drum, said first signal being provided by said grid means with a periodic modulation which varies cyclically with increments of displacement of said carriage; and
said synchronizing means including means for phase locking cycles of modulation waveform of said first signal with cycles of modulation waveform of said second signal to establish a predetermined number of the printing spiral.

14. The system according to claim 13 wherein said grid means comprises a first grid disposed along said path and a second grid, said carriage being movable relative to said first grid, said carriage being fixed to said second grid for moving said second grid alongside said first grid during movement of said carriage, said grid means further comprising optical means for directing a light beam serially through said first and said second grids such that relative motion between said grids introduces a modulation of said light beam, said optical means including a detector of said modulation of said light beam for outputting said first signal.

15. The system according to claim 14 wherein said first grid is constructed as a jacket overlying said printing medium.

16. The system according to claim 13 wherein said sensor means includes a set of markings of varying spatial frequency fixed to said drum, and optical means for illuminating said set of markings with a light beam, the varying spatial frequency of said markings modulating said light beam upon rotational movement of said drum, said optical means including a detector of modulation of said light beam for outputting said second signal.

17. The system according to claim 15 wherein said markings of said sensor are located on an end surface of said drum, and extend radially from said drum axis.

18. The system according to claim 15 wherein said markings of said sensor means are located on a cylindrical surface of said drum.

19. The system according to claim 13 wherein said grid means comprises a first grid disposed along said path and a second grid, said carriage being movable relative to said first grid, said carriage being fixed to said second grid for moving said second grid alongside said first grid during movement of said carriage, said grid means further comprising optical means for directing a light beam serially through said first and said second grids such that relative motion between said grids introduces a modulation of said light beam, said optical means including a detector of said modulation of said light beam for outputting said first signal; and wherein
said sensor means includes a set of markings of varying spatial frequency fixed to said drum, and optical means for illuminating said set of markings with a light beam, the varying spatial frequency of said markings modulating said light beam upon rotational movement of said drum, said optical means including a sensor of modulation of said light beam for outputting said second signal.

20. The system according to claim 19 wherein said synchronizing means includes means for varying the number of displacement increments of said carriage in the pitch of said spiral.

21. A system according to claim 19 wherein said synchronizing means includes means for varying the number of displacement increments of said carriage in the pitch of said spiral.

* * * * *